United States Patent Office 3,746,524
Patented July 17, 1973

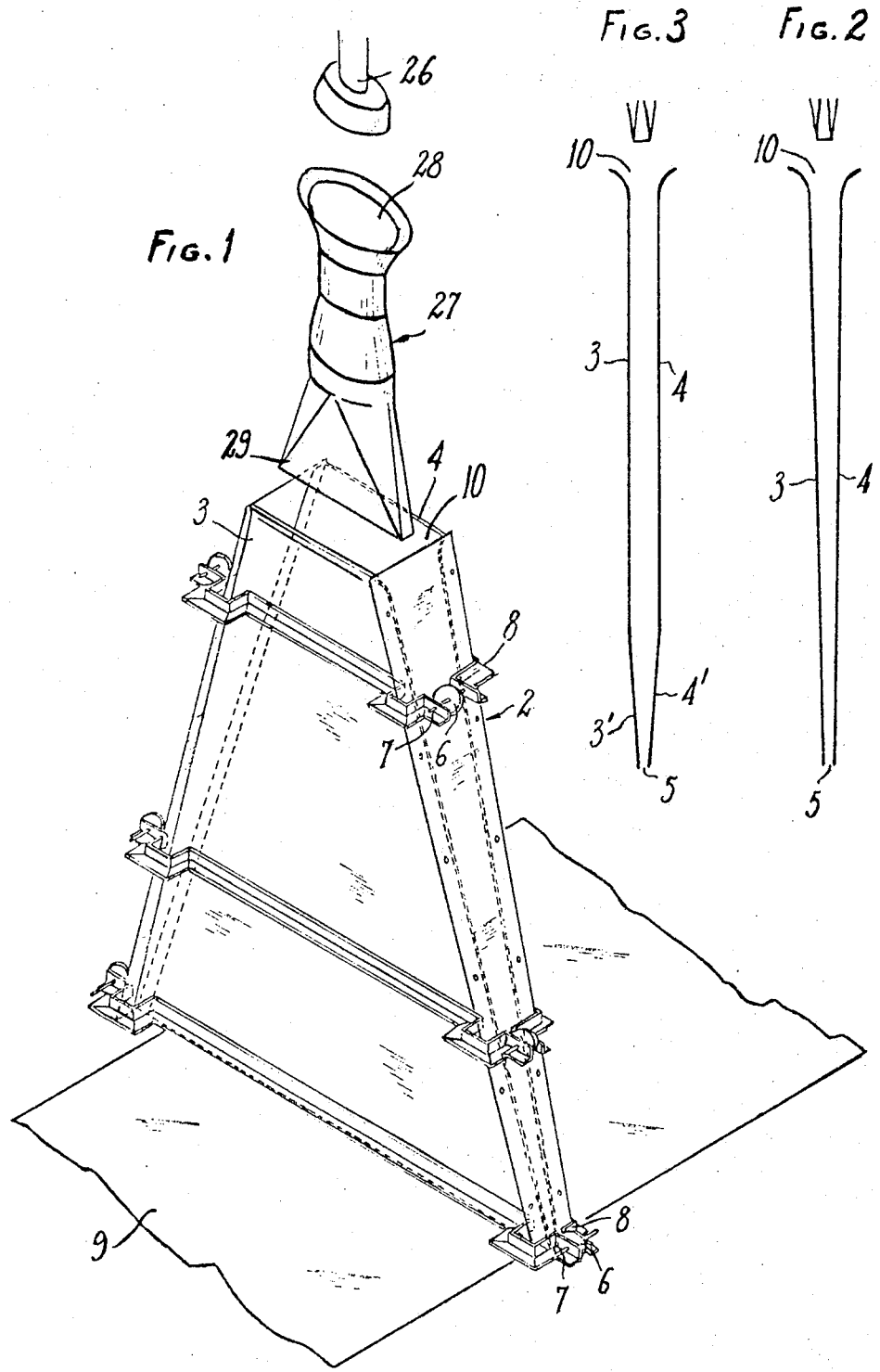

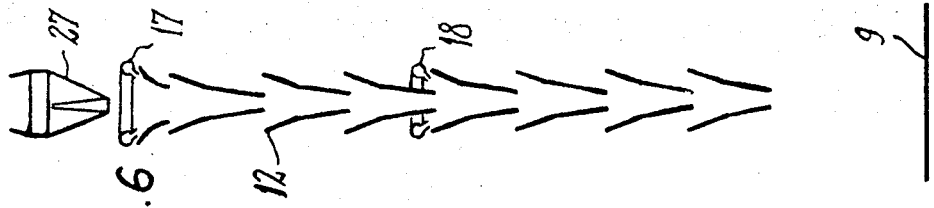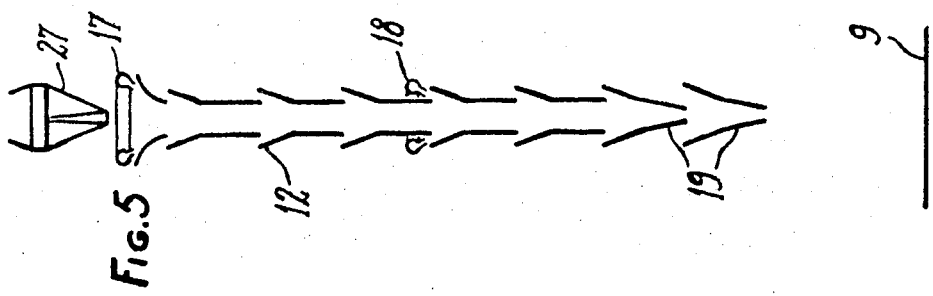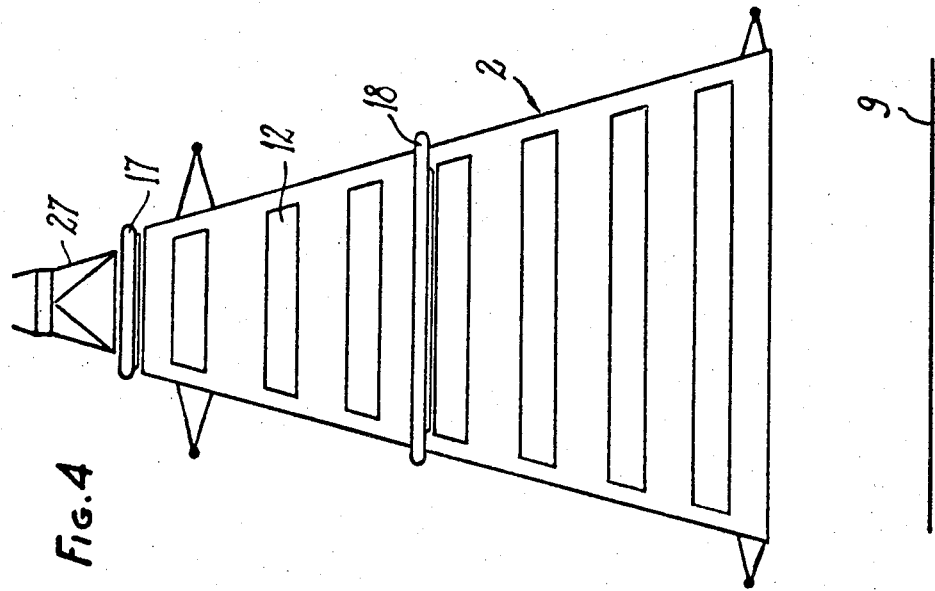

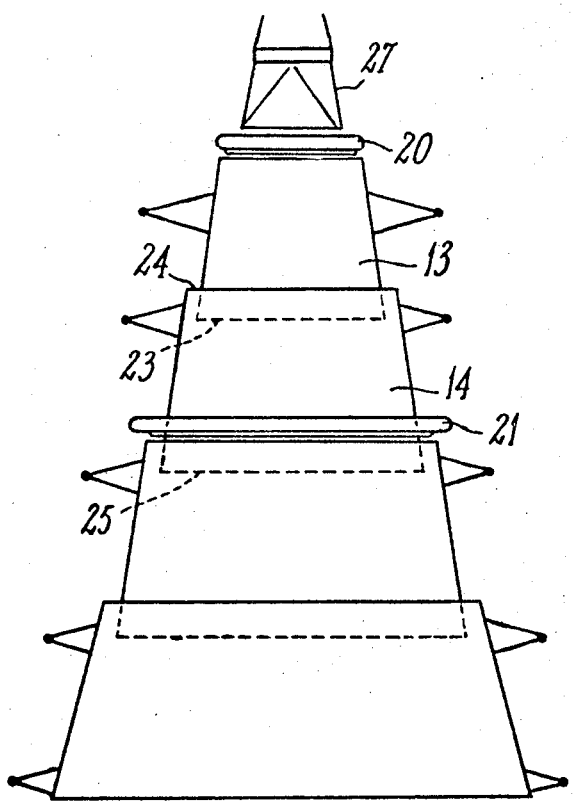
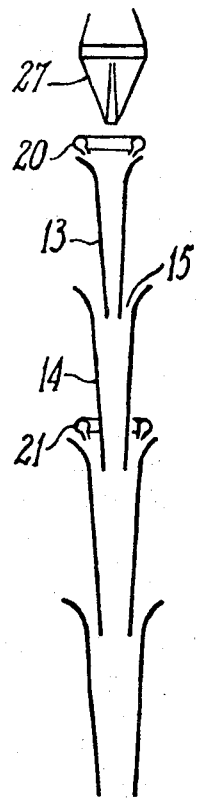
FIG. 7
FIG. 8

3,746,524
METHOD OF AND APPARATUS FOR THE PRODUCTION OF PADS OR MATS OF FIBERS FROM THERMOPLASTIC MATERIALS
Jean-Jacques Kirchheim, Saint Maur-des-Fosses, France, assignor to Saint-Gobain, Neuilly-sur-Seine, France
Filed Sept. 15, 1971, Ser. No. 180,758
Claims priority, application France, Sept. 18, 1970, 7033875
Int. Cl. C03b 37/04, 37/06
U.S. Cl. 65—6  22 Claims

ABSTRACT OF THE DISCLOSURE

The invention relates to the production of homogeneous and structurally resistant sheets or mats of thermoplastic fibers, such as glass fibers, issuing from a rotary centrifuge above a travelling conveyor. The molten filaments, discharged in radial directions in substantially horizontal planes, are transformed into fibrous form by a downwardly directed annular attenuating gaseous blast, and the resulting annular curtain of fibers is guided through a shaping assembly comprising a tuyere having a circular inlet and an elongated rectangular outlet with substantially elliptical intermediate sections of increasing flatness therebetween in the direction of travel of the curtain of fibers. The flattened curtain of fibers then passes through a shaping member formed essentially of a pair of large trapezoidally-shaped plane surfaces of predetermined spacings therebetween to obtain critical cross-sectional areas at its inlet and outlet as well as at intermediate portions thereof, with convergent portions between said surfaces, as well as provisions for the introduction of air into the interior thereof, which aid in the conveyance of the fibers to the outlet of said shaping member in proximity to the conveyor, whereon they are deposited smoothly across substantially the entire width thereof without the formation of lumps or nodules.

---

The present invention is concerned with the production of pads or mats from fibers of thermoplastic materials, particularly glass fibers. It relates especially to the utilization of fibers produced by a rotary centrifuge, wherein molten thermoplastic material is fed into the interior of a hollow body rotating rapidly around a vertical axis, said body having a plurality of rows of orifices in the peripheral wall thereof. The molten material is projected through the orifices in the form of filaments by the action of centrifugal force, and these filaments are then subjected to the action of transversely directed gaseous currents which transform and attenuate them into fibers, which are then deposited on a travelling conveyor.

A great problem posed by the manufacture of these mats from fibers of thermoplastic materials is that of the homogeneous distribution of these fibers on the travelling conveyor member. In fact, the gaseous fluid entraining the fibers during their travel towards the conveyor undergoes a contraction by reason of its cooling, and draws in uncontrollable lateral currents of induced air. These laterally induced air currents give rise to whirling and eddies, so that the possibility of only the formation of wicks or balls is expected as a result of these turbulences. These phenomena oppose and prevent the obtention of a regular and uniform deposit of the fibers on the conveyor.

The present invention provides a method and apparatus for producing fibrous pads having a high degree of homogeneity and uniformity. It is characterized especially by the fact that the gaseous fluid which transforms the centrifugally projected filaments into fibers, is channeled through a shaping member which discharges in the vicinity of the conveyor, said shaping member being provided with two large surfaces of generally flat form, converging at least over a portion of their length in the zone near the outlet portion, and the outlet end of which is of such dimensions that the fibers are distributed uniformly over the entire width of the conveyor.

The invention is characterized by the fact that the regularity, the intensity and the decrease of speed of flow in the shaping member may be controlled through the conjugated and correlated action of the variation of the cross-section of this member and the introduction of additional fluids. In accordance with the invention, additioal fluids, for example, blown air, or even induced air, are introduced into the interior of the shaping member, and at different levels thereof, this being done in such a way that the quantity of fluid per unit of surface remains substantially constant across all cross-sections of the shaping member. It is another characteristic of the invention that the volume of additional fluids introduced into the shapping member is of the order of eight to ten times the volume of gaseous fluid which effects the attenuation of the filaments into fibers.

It is also the object of the invention to provide an apparatus for executing the method described above. This apparatus comprises, in combination with a rotary centrifuge consisting of a rotary body wherefrom is discharged the molten glass filaments and a blower member adjacent thereto for attenuating the filaments into fibers, a receiving member for the fibers, and a shaping device. The latter comprises a tuyere or conduit for receiving the assembly or curtain of fibers which is produced and a shaping member therefor formed of two substantially plane large surfaces, of generally trapezoidal shape with their large bases located near the receiving member, defining a space which communicates with the above-mentioned tuyere and which discharges near the receiving member, said surfaces converging at least over a portion of their length in proximity to the latter.

Other characteristics and advantages of the invention will appear from the following description of several illustrative examples thereof, in conjunction with the accompanying drawings, wherein FIG. 1 is a perspective view of one embodiment of the invention;

FIG. 2 is a schematic vertical sectional view of FIG. 1, in a longitudinal plane;

FIG. 3 is a schematic vertical sectional view, similar to FIG. 2, of a variant embodiment;

FIG. 4 is a side view of another embodiment of a shaping unit in accordance with the invention;

FIG. 5 is a schematic vertical sectional view of FIG. 4, in a longitudinal plane;

FIG. 6 is a schematic vertical sectional view similar to FIG. 5 of a variant embodiment;

FIG. 7 is a side view of still another embodiment of a shaping device in accordance with the invention; and FIG. 8 is a schematic vertical sectional viwe of FIG. 7 in a longitudinal plane.

In FIGS. 1 to 3 is shown very schematically, a rotary centrifuge device 26 for producing the glass fibers. As set forth above, this device may comprise a rapidly rotating hollow body provided with orifices in the peripheral wall thereof, through which are projected by centrifugal force, filaments of the molten vitreous material, which are then subjected to the action of a transversely directed annular attenuating gaseous blast which draws out the fibers and directs them downwardly in the form of an annular curtain. Such devices are described in U.S. Reissue Pat. No. 24,708, and Pat. No. 2,991,507. The shaping device or assembly for the fibers is disposed below the centrifuge and comprises two essential parts, namely:

(1) an open-ended conduit receiver or tuyere 27 which is shaped specially to receive the annular curtain of fibers dropping from the centrifuge device and to flatten the curtain for passage through the next element of the shaping assembly. As shown in FIG. 1, the inlet 28 of tuyere 27 is of circular section and the outlet 29 is shaped as an elongated slot, with the intermediate sections being of elliptical contour, the flatness of which increases in the direction of travel of the fibers from the inlet to the outlet ends; and (2) a second element 2, which may be designed as a shaping member which is disposed below tuyere 27 and which comprises two large substantially plane surfaces 3 and 4, of generally trapezoidal shape, with their large bases positioned close to the receiving member 9, to define a space communicating at its inlet end 10 with the interior of the tuyere 27 and discharging in proximity to the receiving member.

In the embodiment shown in FIGS. 1 and 2, the two large surfaces 3 and 4 converge over their entire length. On the other hand, in the variant embodiment shown in FIG. 3, the two large surfaces 3 and 4 converge only over one portion of the length thereof, mainly at the portions 3' and 4', respectively, adjacent to the outlet end.

In order to regulate the cross-sectional area available for the passage of the gaseous fluids which entrain the fibers, adjusting means are provided for this purpose. As shown in FIG. 1, this adjusting means may assume the form of screw 6, in engagement with threaded rods 7, which act on the large surfaces 3 and 4 by means of connections which, in this example, are constituted by angle irons 8.

The sheet or mat of fibers which passes through the shaping assembly 27–2, is deposited on receiving member 9 which may assume the form of a travelling conveyor which may move continuously in the direction perpendicular to the two large surfaces 3 and 4.

As mentioned above, it may be advantageous to introduce additional fluids, for example, in the form of induced air, into the shaping member, at different levels thereof. In the embodiment shown in FIGS. 1 to 3, air is induced into the interior of the shaping member, for example, between outlet 29 of tuyere or conduit 27 and inlet 10 of shaping member 2 which is disposed below the conduit.

According to the invention, the control of the regularity, intensity and decrease in speed of the flow of gaseous fluid entraining the fibers may be realized by the conjugate or correlated action between the variation of cross-section of the shaping member and the introduction of additional fluids thereinto. As set forth above, in the arrangement shown in FIGS. 1 to 3, the introduction of additional fluids is effected by induced air. According to the invention, this introduction is regulated in such a way that the quantity of fluid per unit of surface remains substantially constant across all cross-sectional areas of the shaping member.

The cross-section of the inlet opening 10 of the shaping member may be varied, by the operation of the adjusting screws or tightening devices, so as to obtain, for example, a volume of induced air which amounts to from eight to ten times the volume of gaseous fluid serving to attenuate the filaments into fibers. In the same manner the cross-sections of outlet 5 and inlet 10 may be so regulated that the cross-sectional area of outlet 5 is of the order of being the same or double that of the cross-sectional area of inlet 10.

The embodiments of the invention shown in FIGS. 4 to 8 make possible the introduction of a volume of additional fluids either in the form of a controlled quantity of induced air, or in the form of air or steam produced by blowers, in proportion to the increasing cross-section of the interior of the shaping member and corresponding to the increase in volume therein. As described above, there can thus be obtained, over the entire height of the shaping member, a uniform quantity of fluid per unit of surface at each cross-section thereof, which results in a flow of reduced turbulence.

Referring to FIGS. 4 to 6, it is seen that the shaping assembly is similar to that shown in the preceding figures, but its lower part, namely, shaping member 2 is provided with openings and shutters 12 therefor, which preferably are adjustable, to permit the induction of air therethrough. In this embodiment, shutters 12 are placed on each of the large trapezoidal surfaces. In addition, blowers 17, 18 are provided and are so arranged as to introduce additional gaseous fluids into the interior of the shaping member. As shown in FIGS. 4 to 6, one of these blower conduits 17 is placed at the top opening of element 2 of the shaping assembly and a second blower 18 discharges in one of the shutters 12 at a lower level. It is obvious that the number, position and distribution of these blower units will be determined by the operation of each particular case in order to attain the control conditions of the invention referred to above.

It will be noted that in the structural arrangement indicated in FIG. 5, the large surfaces of the shaping member of the assembly converge only at 19, over a portion of their length close to the conveyor 9, while in FIG. 6, they converge at multiple points along their entire length.

In the embodiment shown in FIGS. 7 and 8, the lower unit of the shaping assembly is constituted by several superposed elements, such as 13, 14, between which the induction of air takes place. These elements comprise two large plane surfaces which converge over at least a portion of their length in the zone adjacent to the outlet section. In the illustrated embodiment (FIG. 8), the large plane surfaces are shown with convergences along their entire length. According to the invention, the outlet 23 of each of the elements of the shaping member is lower than the inlet 24 of the following element. In addition, the cross-section of the outlet 25 of each element is at least equal to that of its inlet 24. Blowers 20 and 21 are also provided in this embodiment which are arranged to introduce gaseous fluids into the interior of the shaping member under the same conditions as those described above. Blower unit 20 is disposed at the entrance of the shaping member and blower 21 is positioned between two successive elements. Naturally, additional blowers 21 could be provided at the inlets of other elements.

The devices in accordance with the invention possess the special advantage of avoiding the regrouping of the fibers, and the capability of spreading them out over the conveyor without forming lumps or nodules. The arrangement shown in FIGS. 7 and 8 also makes possible a preferential orientation of the fibers on the conveyor in such a way as to improve the resistance or strength of the sheet. This may be done by deforming and/or modifying the orientation or inclination of at least one of the successive elements 13, 14 of the shaping member.

It is understood that the invention is not limited to the specific embodiments described above, and that variations may be made thereon, which fall within the scope of the following claims:

I claim:

1. The method of producing mats of glass fibers, of uniform texture, from filaments of molten vitreous material which are projected radially in substantially horizontal planes from a rotary centrifuge, and attenuated into fine fibers by a downwardly directed annular gaseous blast which simultaneously turns the annular curtain of fibers for deposition onto a travelling conveyor disposed therebelow, which comprises dropping the curtain of fibers through a chamber of circular section at its inlet, and elongated section at its outlet, to flatten said curtain of fibers along a plane transverse to the direction of travel of said conveyor, channeling the curtain of fibers and the attenuating gas through a converging shaping member of increasing cross-section and of such dimensions that the fibers discharged therefrom above said conveyor are distributed uniformly over substantially the entire width thereof, and introducing additional gaseous fluid into the shaping member according to the increasing section thereof to control the regularity, intensity and decrease of the velocity of flow therethrough.

2. The method set forth in claim 1, wherein the introduction of the additional gaseous fluid into the interior of the shaping member is executed at different levels thereof.

3. The method set forth in claim 1, wherein the additional gaseous fluid is introduced in such quantity that the volume per unit area at the different sections of the shaping member remains substantially constant.

4. The method set forth in claim 3, wherein the volume of additional gaseous fluid is approximately eight to ten times the volume of the attenuating gases.

5. The method set forth in claim 1, wherein the additional gaseous fluid is comprised of, at least in part, induced air.

6. The method set forth in claim 1, wherein the step of introducing gaseous fluid into the shaping member is executed, at least in part, by blowing the gaseous fluid thereinto.

7. In an apparatus for producing mats from fine fibers of hardened thermoplastic material, in combination with a rotary centrifuge and surrounding blowing chamber wherefrom are radially projected filaments of the material in a viscous state, which are attenuated into fine fibers, by a downwardly directed annular gaseous blast emanating from said blowing chamber, for deposition on a travelling conveyor therebelow,
 (a) a receptor conduit below said rotary centrifuge and blowing chamber for receiving the annular curtain of fine fibers and attenuating gas,
 (b) a shaping member below said receptor conduit having the inlet thereof spaced from the outlet of said receptor conduit and the outlet thereof spaced from said traveling conveyor,
 (c) said shaping member comprising a pair of large substantially plane surfaces of trapezoidal outline spaced from each other with the enlarged bases thereof adjacent to said travelling conveyor and with the tops thereof defining an inlet passage communicating with the interior of said receptor conduit thereabove, and
 (d) said plane surfaces converging towards each other slightly, at least adjacent to the lower ends thereof.

8. An apparatus as set forth in claim 7, wherein said large plane surfaces are so shaped and spaced from each other that the cross-section of the outlet end of said shaping member is one to two times the cross-section of the inlet end thereof.

9. An apparatus as set forth in claim 7, wherein said large plane surfaces are provided with openings with shutters adapted to permit the induction of air into the interior of said shaping member.

10. An apparatus as set forth in claim 7, wherein said shaping member is constituted by a plurality of superposed elements spaced from each other by spacing gaps, said last-mentioned gaps providing passages for the entry of air into said shaping member.

11. An apparatus as set forth in claim 10, wherein said superposed elements comprise successive pairs of large substantially planar surfaces, the surfaces of each pair converging towards each other at least along a portion of the length thereof.

12. An apparatus as set forth in claim 10, wherein the level of the outlet of each superposed element terminates below the level of the inlet of the next lower superposed element.

13. An apparatus as set forth in claim 10, wherein the cross-section of the outlet of each superposed element is at least as great as the cross-section of the inlet thereof.

14. An apparatus as set forth in claim 7, including means for blowing additional gas into the interior of said shaping member to supplement the attenuating gas.

15. An apparatus as set forth in claim 10, including a blowing device disposed adjacent to the inlet of the uppermost element.

16. An apparatus as set forth in claim 10, including at least one blower at one of said spacing gaps for blowing a gaseous medium into the interior of said shaping member.

17. An apparatus as set forth in claim 7, including means for adjusting the spacing between the large plane surfaces of said shaping member to modify the passage for the gases entraining the fibers through said shaping member.

18. An apparatus as set forth in claim 7, including framing devices on the opposite large plane surfaces of said shaping member in alignment with each other, and threaded adjusting means cooperating with said framing devices to vary the spacing between said large plane surfaces.

19. An apparatus as set forth in claim 10, including means for adjusting the outline of at least one of said superposed elements with respect to the adjacent one to control the deposition of the fibers on the travelling conveyor.

20. An apparatus as set forth in claim 19, including means for adjusting the orientation of at least one of said superposed elements with respect to the adjacennt one to control the pattern of the deposition of the fibers relative to the travelling conveyor.

21. An apparatus as set forth in claim 7, wherein said receptor conduit is of circular cross-section at its inlet end and of an elongate rectangular cross-section at its outlet end.

22. An apparatus as set forth in claim 21, wherein the sections of said receptor conduit between the inlet and outlet thereof are of substantially elliptical cross-section corresponding to the flattening of the hollow curtain of fibers as it travels downwardly from the rotary centrifuge towards said shaping member.

References Cited

UNITED STATES PATENTS

| | | | |
|---|---|---|---|
| 2,707,690 | 5/1955 | Pearson | 264—121 X |
| 2,897,874 | 8/1959 | Stalego et al. | 65—6 X |
| 3,326,650 | 6/1967 | Winn | 65—14 X |
| 3,532,479 | 10/1970 | Stalego | 65—5 X |

FOREIGN PATENTS

| | | | |
|---|---|---|---|
| 794,319 | 4/1958 | Great Britain | 65—14 |

ROBERT L. LINDSAY, Jr., Primary Examiner

U.S. Cl. X.R.

65—14; 156—62.4; 264—121